(12) United States Patent
Bjontegard

(10) Patent No.: US 8,175,156 B2
(45) Date of Patent: May 8, 2012

(54) EIGHT PIXELS INTEGER TRANSFORM

(75) Inventor: Gisle Bjontegard, Oppegard (NO)

(73) Assignee: Cisco Technology, Inc., San Jose, CA (US)

( * ) Notice: Subject to any disclaimer, the term of this patent is extended or adjusted under 35 U.S.C. 154(b) by 1144 days.

(21) Appl. No.: 11/972,942

(22) Filed: Jan. 11, 2008

(65) Prior Publication Data

US 2008/0175323 A1    Jul. 24, 2008

(30) Foreign Application Priority Data

Jan. 11, 2007    (NO) .................................. 20070193

(51) Int. Cl.
     *H04N 11/02*      (2006.01)
(52) U.S. Cl. .......... 375/240.12; 375/240.22; 375/240.24
(58) Field of Classification Search ............. 375/240.18, 375/240.22, 240.24
See application file for complete search history.

(56) References Cited

U.S. PATENT DOCUMENTS

| | | | |
|---|---|---|---|
| 2004/0233993 A1* | 11/2004 | Johansen et al. ......... | 375/240.18 |
| 2004/0264575 A1* | 12/2004 | Bjontegaard ............. | 375/240.18 |
| 2005/0111554 A1 | 5/2005 | Zhou | |
| 2008/0175323 A1* | 7/2008 | Bjontegard .............. | 375/240.18 |
| 2008/0310504 A1* | 12/2008 | Ye et al. ................... | 375/240.02 |
| 2008/0310512 A1* | 12/2008 | Ye et al. ................... | 375/240.16 |
| 2009/0097548 A1* | 4/2009 | Karczewicz et al. ..... | 375/240.03 |
| 2010/0086049 A1* | 4/2010 | Ye et al. ................... | 375/240.16 |
| 2010/0166059 A1* | 7/2010 | Johansen et al. .......... | 375/240.2 |
| 2010/0328425 A1* | 12/2010 | Nagaraj et al. ................. | 348/42 |

OTHER PUBLICATIONS

Mathias Wien, "Variable Block-Size Transforms for H.264/AVC", IEEE Transactions on Circiuts and Systems for Video Technology, vol. 13, No. 7, Jul. 1, 2003, XP011099253, pp. 604-613.
Mathias Wien, et al., "Integer Transforms for H.26L Using Adaptive Block Transforms", Video Standards and Drafts, No. q15k24, Aug. 22, 2000, XP030003117, pp. 1-5.
Mathias Wien, et al., "16 Bit Adaptive Block Size Transforms", Video Standards and Drafts, No. JVT-C107, May 10, 2002, XP030005216, pp. 1-16.
Gisle Bjontegaard, "Addition of 8×8 Transform to H.26L", Video Standards and Drafts, No. q15139, Oct. 11, 1999, XP30003009, pp. 1-2.

\* cited by examiner

*Primary Examiner* — Andrew Lee
(74) *Attorney, Agent, or Firm* — Oblon, Spivak, McClelland, Maier & Neustadt, L.L.P.

(57) ABSTRACT

A method of video coding/decoding that includes transforming to/from transform coefficients and residual pixel data in moving pictures by a set of vectors. Two alternative vector sets are disclosed both providing an optimal balance between good performance and simplified computation.

16 Claims, 3 Drawing Sheets

EIGHT PIXELS INTEGER TRANSFORM

CROSS-REFERENCE TO RELATED APPLICATION

The present application claims the benefit of priority under 35 USC 119 to Norwegian Application No. 20070193, filed Jan. 11, 2007, the entire contents of which are hereby incorporated by reference.

FIELD OF THE INVENTION

The invention is related to video compression systems, and in particular to a method utilizing an integer transform function.

BACKGROUND OF THE INVENTION

Transmission of moving pictures in real-time is employed in several applications like e.g. video conferencing, net meetings, TV broadcasting and video telephony. However, representing moving pictures requires bulk information as digital video which typically is described by representing each pixel in a picture with 8 bits (1 Byte). Such uncompressed video data results in large bit volumes, and can not be transferred over conventional communication networks and transmission lines in real time due to limited bandwidth.

Thus, enabling real time video transmission requires a large extent of data compression. Data compression may, however, compromise picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors. The prediction process is typically performed on square block sizes (e.g. 16×16 pixels). Note that in some cases, predictions of pixels based on the adjacent pixels in the same picture rather than pixels of preceding pictures are used. This is referred to as intra prediction, as opposed to inter prediction.

The residual represented as a block of data (e.g. 4×4 or 8×8 pixels) still contains internal correlation. A well-known method of taking advantage of this is to perform a two dimensional block transform. The ITU recommendation H.264 uses a 4×4 integer type transform. This transforms 4×4 pixels into 4×4 transform coefficients and they can usually be represented by fewer bits than the pixel representation. Transform of a 4×4 array of pixels with internal correlation will probably result in a 4×4 block of transform coefficients with much fewer non-zero values than the original 4×4 pixel block.

Direct representation of the transform coefficients is still too costly for many applications. A quantization process is carried out for a further reduction of the data representation. Hence the transform coefficients undergo quantization. The possible value range of the transform coefficients is divided into value intervals each limited by an uppermost and lowermost decision value and assigned a fixed quantization value. The transform coefficients are then quantified to the quantization value associated with the intervals within which the respective coefficients reside. Coefficients being lower than the lowest decision value are quantified to zeros. It should be mentioned that this quantization process results in that the reconstructed video sequence is somewhat different compared to the uncompressed sequence.

SUMMARY

A non-limiting embodiment of the present invention includes a method of video coding, including: transforming a first block of residual pixel values of pictures by an integer transform function; generating a corresponding second block of transform coefficients, wherein the integer transform function includes a vector set of eight vectors, said vector set is defined as:

0: [13   13   13   13   13   13   13   13]*n
1: [19   15    9    3   −3   −9  −15  −19]*n
2: [17    7   −7  −17  −17   −7    7   17]*n
3: [9     3  −19  −15   15   19   −3   −9]*n
4: [13  −13  −13   13   13  −13  −13   13]*n
5: [15  −19   −3    9   −9    3   19  −15]*n
6: [7   −17   17   −7   −7   17  −17    7]*n
7: [3    −9   15  −19   19  −15    9   −3]*n or

0: [169   169   169   169   169   169   169   169]*m
1: [247   195   117    39   −39  −117  −195  −247]*m
2: [221    91   −91  −221  −221   −91    91   221]*m
3: [183   −59  −243  −135   135   243    59  −183]*m
4: [169  −169  −169   169   169  −169  −169   169]*m
5: [135  −243    59   183  −183   −59   243  −135]*m
6: [91   −221   221   −91   −91   221  −221    91]*m
7: [39   −117   195  −247   247  −195   117   −39]*m where m and n are non-zero integer numbers.

Another non-limiting embodiment of the present invention includes a method of decoding that includes transforming a first block of integer transform coefficients of moving pictures by an integer inverse transform function; generating a corresponding second block of residual pixel values, wherein the integer inverse transform function includes a vector set of eight vectors, said vector set is defined as:

```
0:  [13   13   13   13   13   13   13    13]^T *n
1:  [19   15    9    3   -3   -9  -15   -19]^T *n
2:  [17    7   -7  -17  -17   -7    7    17]^T *n
3:  [ 9    3  -19  -15   15   19   -3    -9]^T *n
4:  [13  -13  -13   13   13  -13  -13    13]^T *n
5:  [15  -19   -3    9   -9    3   19   -15]^T *n
6:  [ 7  -17   17   -7   -7   17  -17     7]^T *n
7:  [ 3   -9   15  -19   19  -15    9    -3]^T *n
``` or

```
0:  [169   169   169   169   169   169   169    169]^T *m
1:  [247   195   117    39   -39  -117  -195   -247]^T *m
2:  [221    91   -91  -221  -221   -91    91    221]^T *m
3:  [183   -59  -243  -135   135   243    59   -183]^T *m
4:  [169  -169  -169   169   169  -169  -169    169]^T *m
5:  [135  -243    59   183  -183   -59   243   -135]^T *m
6:  [ 91  -221   221   -91   -91   221  -221     91]^T *m
7:  [ 39  -117   195  -247   247  -195   117    -39]^T *m
``` where m and n are non-zero integer numbers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
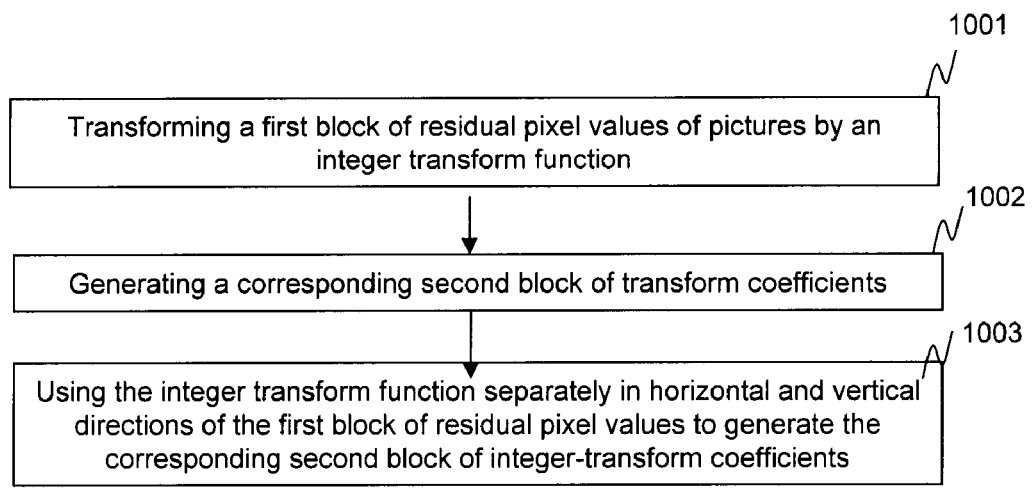
FIG. 1 shows an exemplary method of video coding.

A non-limiting embodiment of the present invention provides a novel 8-pixel digital transform balancing between performance and simplicity in the coding and decoding process.

As mentioned above, most of the present video coding methods use block based coding. A block is typically a collection of pixels consisting of for instance 4×4, 8×8 or 16×16 pixels. Assume that the block to be coded is O(i,j), which also could be referred to as the original pixel data. Moreover it is common to form a prediction P(i,j) based on already decoded picture data. These pixels may belong to the same picture as O(i,j) (intracoding) or one or more other pictures (interceding). It is advantageous if P(i,j) is as close to O(i,j) as possible. However, in most cases, there is a significant residual, i.e. a significant difference between the prediction and the real data:

$$R(i,j)=O(i,j)-P(i,j)$$

The prediction is calculated similarly, and hence with the same result, both when coding at the transmitting side, and decoding at the receiving side. Therefore, R(i,j) is usually the main part of the video signal to be coded and transmitted.

It is therefore also important that R(i,j) is coded in an efficient way. As indicated earlier, it is therefore usual to perform a 2 dimensional transform of the raw pixel difference data R(i,j) before coding. The 2 dimensional transform is often obtained by using a one dimensional transform separately in the horizontal and vertical direction. It is therefore only necessary to define a one dimensional transform. One candidate transform that conventionally has been used is the Discrete Cosine transform (DCT). This transform works well if there is a reasonably large correlation between pixels in R(i,j). However, DCT is a transform based on floating point numbers. This usually means an additional complexity compared to using integer numbers. Therefore—in recent standards like H.264 integer transforms are used.

H.264 can use both 4×4 and 8×8 transform. The specified one dimensional transform basis functions are:

4-pixel transform

```
0:  1   1   1   1
1:  2   1  -1  -2
2:  1  -1  -1   1
3:  1  -2   2  -1
```

8-pixel transform

```
0:   1    1    1    1    1    1    1    1
1:  12   10    6    3   -3   -6  -10  -12
2:   2    1   -1   -2   -2   -1    1    2
3:  10   -3  -12   -6    6   12    3  -10
4:   1   -1   -1    1    1   -1   -1    1
5:   6  -12    3   10  -10   -3   12   -6
6:   1   -2    2   -1   -1    2   -2    1
7:   3   -6   10  -12   12  -10    6   -3
```

For the 4-pixel transform, the lines are marked 0 to 3. This indicates 4 transform coefficients that represent the 4 pixels in a different way than specifying the 4 pixels individually. The 4 lines are usually denoted as basis vectors of the transform. The basis vectors are orthogonal which means that the product between 2 different vectors is equal to 0. For instance the product between the vectors 0 and 1 is calculated as: (1×2+1×1−1×1−1×2)=0. It is typically a requirement of a transform to have orthogonal basis vectors.

The norm of a basis vector is the square sum of each number. Hence the norm of basis vector 0 is $(1^2+1^2+1^2+1^2)=4$ and of basis vector 1 is $(2^2+1^2+1^2+2^2)=10$. Hence it is seen that this 4-pixel transform has basis vectors with 2 different norms.

For proper reconstruction of data after transform and inverse transform, the size of the norm(s) has to be taken into account. This is typically taken care of in the quantization/dequantization process. This causes little or no additional computational effort as long as the norm is the same for all basis vectors. More effort is needed if the norms are different for the different basis vectors. Likewise the 8-pixel transform has orthogonal basis vectors. For this set of basis vectors there are 3 different norms.

The DCT is considered to be near optimal for use in video compression. The above transforms are reasonably close to the DCT and therefore result in good coding performance.

As earlier mentioned, one of the requirements for a good digital transform is that the basis vectors are orthogonal. It is also important that the basis vectors are close to the DCT, to provide a good performance of the transform process as possible, i.e. limiting the amount of noise introduced by the transform function. Further, the quantization and dequantization process will be simplified if the norms of all the basis vectors are equal, which is not the case for the example basis vectors disclosed above. Finally, the absolute values in the basis vectors should be kept relatively small for the purpose of a simplified computation.

It is quite trivial to fulfil each of these criteria, but the challenge is to find basis vectors fulfilling all the criteria in the same set of vectors. As can been seen, the example basis vectors disclosed above, which are used in the H.264 standard, do not fulfil all these criteria.

A non-limiting embodiment of the present invention discloses two vector sets fulfilling all the criteria above. In addition of being orthogonal and having equal norm values, simulations and tests have shown that the respective sets of basis vectors according to this non-limiting embodiment of the present invention provide an optimal balance between simplified computation and good performance. The two vector sets for an 8×8 transform according to this non-limiting embodiment of the present invention are as follows:

Vector set 1:

```
0:  13   13   13   13   13   13   13   13
1:  19   15    9    3   -3   -9  -15  -19
2:  17    7   -7  -17  -17   -7    7   17
3:   9    3  -19  -15   15   19   -3   -9
4:  13  -13  -13   13   13  -13  -13   13
5:  15  -19   -3    9   -9    3   19  -15
6:   7  -17   17   -7   -7   17  -17    7
7:   3   -9   15  -19   19  -15    9   -3
```

Vector set 2:

```
0: 169   169   169   169   169   169   169   169
1: 247   195   117    39   -39  -117  -195  -247
2: 221    91   -91  -221  -221   -91    91   221
3: 183   -59  -243  -135   135   243    59  -183
4: 169  -169  -169   169   169  -169  -169   169
5: 135  -243    59   183  -183   -59   243  -135
6:  91  -221   221   -91   -91   221  -221    91
7:  39  -117   195  -247   247  -195   117   -39
```

This non-limiting embodiment of the present invention also covers all sets of basis vectors that are obtained by multiplying all entries in one of the vector sets above with the same integer number.

The above-noted basis vectors, each consisting of 8 integer numbers, fulfils the following requirements:
1. Each vector shall be orthogonal to each other
2. Each vector shall have the same norm (the square sum of all numbers in each vector shall be the same)
3. Each vector shall be reasonably close to the corresponding scaled vectors of the Discrete Cosine transform (DCT). They cannot be equal since the DCT is defined by real numbers. They should be close enough so that the coding efficiency is practically the same.
4. The numbers should be reasonably small to allow for reasonably small registers in the CPU. Computing within 16 bits is usually a target.

It is not a simple mathematical calculation to arrive at basis vectors that satisfy the above-noted conditions and it not a matter of routine experimentation to arrive at these basis vectors. The inventor has appreciated the significance of the numbers in the basis vectors. The derivation of these basis vectors is explained below.

In deriving these basis vectors, it was assumed that we will allow numbers in the range -32 to 32 and that basic symmetries that are found in the DCT would be used. Then there are about 1030 possible data sets to be checked against the requirements above. This is far too high for an exhaustive search to be possible. Therefore a more realistic search structure has to be designed. Some of the elements in the structure used for the present invention:

Limit each number to be within a certain distance from the target DCT. This limitation can be different for each vector since it is more important that the first vectors are close to the DCT than the last ones.

For each vector set proceed only if requirements 1 and 2 above are fulfilled.

If that is so, calculate a distance from the target DCT. This also takes into account that the first vectors should be closer to the DCT than the last ones.

By doing this, it was found that the first basis vector set in the patent application to be the one that best fulfils 1-4. 1 and 2 are exactly fulfilled. Regarding 4, the absolute value of each number $\leq 19$ which is good. Regarding 3, vectors number 3 and 5 deviates more from the corresponding scaled DCT vectors than the others. However, this does not affect coding efficiency very much since the low frequency vectors 0,1,2 are close.

To improve on requirement 3 the following was done:
Multiply vectors number 0,1,2,4,6,7 by 13
Replace vector number 3 with: 12*vector_3+5*vector_5
Replace vector number 5 with: 12*vector_5-5*vector_3
A crucial point here is that 122+52=132 which result in the same norm for all vectors.

The result is the second basis vector set in the patent application. Requirements 1 and 2 are fulfilled. The vectors are closer to the DCT. On the other hand the numbers are bigger which require a different scaling procedure in the transform and inverse transform.

To obtain a transform coefficient, a set of 8 data values are multiplied with a row of basis vectors and added. As an example the data string (a,b,c,d,e,f,g,h) can be transformed into transform coefficients (A,B,C,D,E,F,G,H) like this:
A=13a+13b+13c+13d+13e+13f+13g+13h
B=19a+15b+9c+3d-3e-9f-15g-19h
C=17a+7b-7c-17d-17e-7f+7g+17h
etc.

Inverse Transform

To perform an inverse transform of a set of 8 data values, multiplications are made with a column in the basis vector array and added. As an example the data string (A,B,C,D,E,F,G,H) can be inverse transformed into (a,b,c,d,e,f,g,h) like this:
a=13A+19B+17C+9D+13E+15F+7G+3H
b=13A+15B+7C+3D-13E-19F-17G-9H
c=13A+9B-7C-19D-13E-3F+17G+15H
etc.

Hence the same set of basis vectors will specify whether the action is transform or inverse transform. It is the use of the set of specified numbers that is different for transform and inverse transform. This is clarified with the examples above.

FIG. 1 shows an exemplary method of video coding. Element 1001 shows that a step of transforming a first block of residual pixel values of pictures by an integer transform function is performed. Element 1002 shows that a step of generating a corresponding second block of transform coefficients is performed. Element 1003 shows that a step of using the integer transform function separately in horizontal and vertical directions of the first block of residual pixel values to generate the corresponding second block of integer-transform coefficients. This method may be performed with the basis vectors described above.

Figure 2:
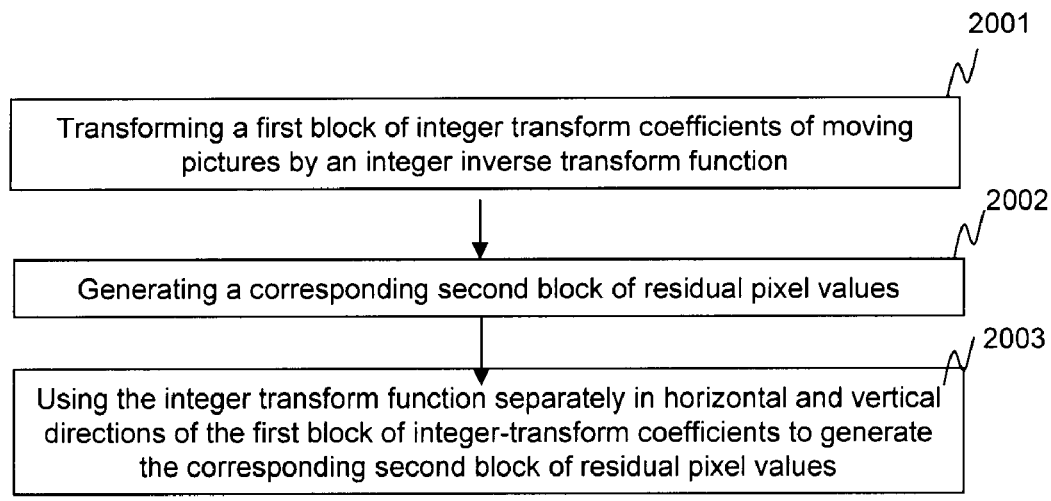
FIG. 2 shows an exemplary method of video decoding.

FIG. 2 shows an exemplary method of video decoding. Element 2001 shows that a step of transforming a first block of integer transform coefficients of moving pictures by an integer inverse function is performed. Element 2002 shows that a step of generating a corresponding second block of residual pixel values is performed. Element 2003 shows that a step of using the integer transform function separately in horizontal and vertical directions of the first block of integer-transform coefficients to generate the corresponding second block of residual pixel values.

Figure 3:
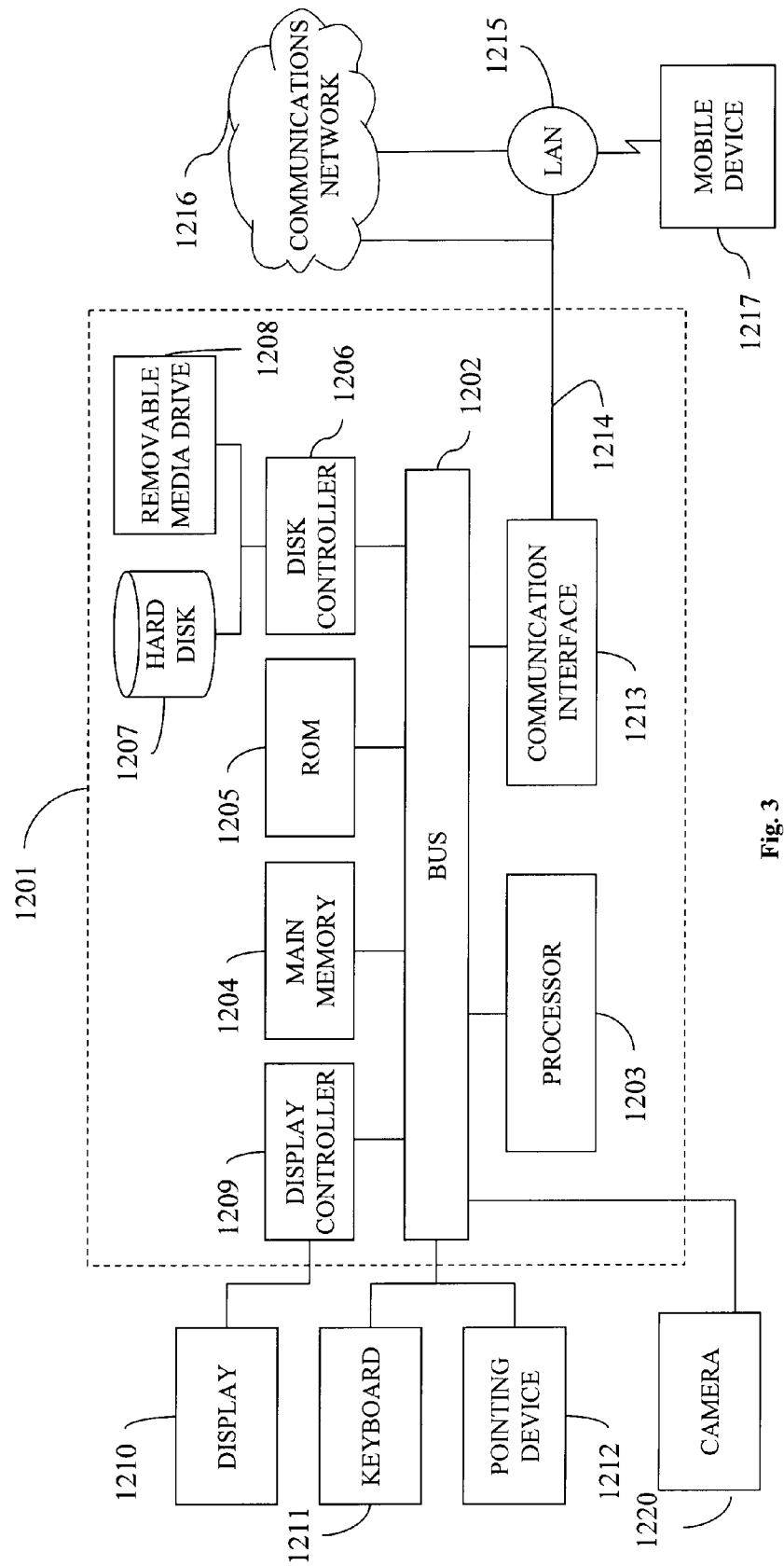
FIG. 3 illustrates a computer system upon which the method of coding and decoding may be implemented.

FIG. 3 illustrates a computer system 1201 upon which the method of coding and decoding may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 120

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable storage medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The invention claimed is:

1. A method of video coding, comprising:

transforming, with a video coding apparatus, a first block of residual pixel values of pictures by an integer transform function;

generating, with the video coding apparatus, a corresponding second block of transform coefficients, wherein the integer transform function includes a vector set of eight vectors, said vector set is defined as:

$$
\begin{aligned}
0: & [13 \quad 13 \quad 13 \quad 13 \quad 13 \quad 13 \quad 13 \quad 13]*n \\
1: & [19 \quad 15 \quad 9 \quad 3 \quad -3 \quad -9 \quad -15 \quad -19]*n \\
2: & [17 \quad 7 \quad -7 \quad -17 \quad -17 \quad -7 \quad 7 \quad 17]*n \\
3: & [9 \quad 3 \quad -19 \quad -15 \quad 15 \quad 19 \quad -3 \quad -9]*n \\
4: & [13 \quad -13 \quad -13 \quad 13 \quad 13 \quad -13 \quad -13 \quad 13]*n \\
5: & [15 \quad -19 \quad -3 \quad 9 \quad -9 \quad 3 \quad 19 \quad -15]*n \\
6: & [7 \quad -17 \quad 17 \quad -7 \quad -7 \quad 17 \quad -17 \quad 7]*n \\
7: & [3 \quad -9 \quad 15 \quad -19 \quad 19 \quad -15 \quad 9 \quad -3]*n
\end{aligned}
$$

or $$
\begin{aligned}
0: & [169 \quad 169 \quad 169 \quad 169 \quad 169 \quad 169 \quad 169 \quad 169]*m \\
1: & [247 \quad 195 \quad 117 \quad 39 \quad -39 \quad -117 \quad -195 \quad -247]*m \\
2: & [221 \quad 91 \quad -91 \quad -221 \quad -221 \quad -91 \quad 91 \quad 221]*m \\
3: & [183 \quad -59 \quad -243 \quad -135 \quad 135 \quad 243 \quad 59 \quad -183]*m \\
4: & [169 \quad -169 \quad -169 \quad 169 \quad 169 \quad -169 \quad -169 \quad 169]*m \\
5: & [135 \quad -243 \quad 59 \quad 183 \quad -183 \quad -59 \quad 243 \quad -135]*m \\
6: & [91 \quad -221 \quad 221 \quad -91 \quad -91 \quad 221 \quad -221 \quad 91]*m \\
7: & [39 \quad -117 \quad 195 \quad -247 \quad 247 \quad -195 \quad 117 \quad -39]*m
\end{aligned}
$$

where m and n are non-zero integer numbers.

2. The method according to claim 1, further comprising:

using the integer transform function separately in horizontal and vertical directions of the first block of residual pixel values to generate the corresponding second block of integer-transform coefficients.

3. The method according to claim 1, wherein the first block and the second block represent a same first squared area of 8×8 pixels in a picture.

4. The method according to claim 3, wherein said first squared area covers one fourth of a macro block representing a second squared area of 16×16 pixels in said picture.

5. A method of decoding, comprising:

transforming, with a video decoding apparatus, a first block of integer transform coefficients of moving pictures by an integer inverse transform function;

generating, with the video decoding apparatus, a corresponding second block of residual pixel values, wherein the integer inverse transform function includes a vector set of eight vectors, said vector set is defined as:

0: [13  13  13  13  13  13  13  13]$^T$ $*n$
1: [19  15  9  3  −3  −9  −15  −19]$^T$ $*n$
2: [17  7  −7  −17  −17  −7  7  17]$^T$ $*n$
3: [9  3  −19  −15  15  19  −3  −9]$^T$ $*n$
4: [13  −13  −13  13  13  −13  −13  13]$^T$ $*n$
5: [15  −19  −3  9  −9  3  19  −15]$^T$ $*n$
6: [7  −17  17  −7  −7  17  −17  7]$^T$ $*n$
7: [3  −9  15  −19  19  −15  9  −3]$^T$ $*n$ or

0: [169  169  169  169  169  169  169  169]$^T$ $*m$
1: [247  195  117  39  −39  −117  −195  −247]$^T$ $*m$
2: [221  91  −91  −221  −221  −91  91  221]$^T$ $*m$
3: [183  −59  −243  −135  135  243  59  −183]$^T$ $*m$
4: [169  −169  −169  169  169  −169  −169  169]$^T$ $*m$
5: [135  −243  59  183  −183  −59  243  −135]$^T$ $*m$
6: [91  −221  221  −91  −91  221  −221  91]$^T$ $*m$
7: [39  −117  195  −247  247  −195  117  −39]$^T$ $*m$ where m and n are non-zero integer numbers.

6. The method according to claim 5, further comprising:
using the integer inverse transform function separately in horizontal and vertical direction of the first block of integer-transform coefficients to generate the corresponding second block of residual pixel values.

7. The method according to claim 5,
wherein the first block and the second block represent a same first squared area of 8×8 pixels in a picture.

8. The method according to claim 7, wherein said first squared area covers one fourth of a macro block representing a second squared area of 16×16 pixels in said picture.

9. A non-transitory computer readable storage medium, encoded with instructions, which when executed by a computer cause the computer to implement a method of video coding, comprising:
transforming a first block of residual pixel values of pictures by an integer transform function;
generating a corresponding second block of transform coefficients,
wherein the integer transform function includes a vector set of eight vectors, said vector set is defined as:

0: [13  13  13  13  13  13  13  13]$*n$
1: [19  15  9  3  −3  −9  −15  −19]$*n$
2: [17  7  −7  −17  −17  −7  7  17]$*n$
3: [9  3  −19  −15  15  19  −3  −9]$*n$
4: [13  −13  −13  13  13  −13  −13  13]$*n$
5: [15  −19  −3  9  −9  3  19  −15]$*n$
6: [7  −17  17  −7  −7  17  −17  7]$*n$
7: [3  −9  15  −19  19  −15  9  −3]$*n$ or

0: [169  169  169  169  169  169  169  169]$*m$
1: [247  195  117  39  −39  −117  −195  −247]$*m$
2: [221  91  −91  −221  −221  −91  91  221]$*m$
3: [183  −59  −243  −135  135  243  59  −183]$*m$
4: [169  −169  −169  169  169  −169  −169  169]$*m$
5: [135  −243  59  183  −183  −59  243  −135]$*m$
6: [91  −221  221  −91  −91  221  −221  91]$*m$
7: [39  −117  195  −247  247  −195  117  −39]$*m$ where m and n are non-zero integer numbers.

10. The non-transitory computer readable storage medium of claim 9, wherein the method further comprises:
using the integer transform function separately in horizontal and vertical directions of the first block of residual pixel values to generate the corresponding second block of integer-transform coefficients.

11. The non-transitory computer readable storage medium of claim 9, wherein the first block and the second block represent a same first squared area of 8×8 pixels in a picture.

12. The non-transitory computer readable storage medium of claim 11, wherein said first squared area covers one fourth of a macro block representing a second squared area of 16×16 pixels in said picture.

13. A non-transitory computer readable storage medium, encoded with instructions, which when executed by a computer cause the computer to implement a method of video decoding, comprising:
transforming a first block of integer transform coefficients of moving pictures by an integer inverse transform function;
generating a corresponding second block of residual pixel values,
wherein the integer inverse transform function includes a vector set of eight vectors, said vector set is defined as:

0: [13  13  13  13  13  13  13  13]$^T$ $*n$
1: [19  15  9  3  −3  −9  −15  −19]$^T$ $*n$
2: [17  7  −7  −17  −17  −7  7  17]$^T$ $*n$
3: [9  3  −19  −15  15  19  −3  −9]$^T$ $*n$
4: [13  −13  −13  13  13  −13  −13  13]$^T$ $*n$
5: [15  −19  −3  9  −9  3  19  −15]$^T$ $*n$
6: [7  −17  17  −7  −7  17  −17  7]$^T$ $*n$
7: [3  −9  15  −19  19  −15  9  −3]$^T$ $*n$ or

0: [169  169  169  169  169  169  169  169]$^T$ $*m$
1: [247  195  117  39  −39  −117  −195  −247]$^T$ $*m$
2: [221  91  −91  −221  −221  −91  91  221]$^T$ $*m$
3: [183  −59  −243  −135  135  243  59  −183]$^T$ $*m$
4: [169  −169  −169  169  169  −169  −169  169]$^T$ $*m$
5: [135  −243  59  183  −183  −59  243  −135]$^T$ $*m$
6: [91  −221  221  −91  −91  221  −221  91]$^T$ $*m$
7: [39  −117  195  −247  247  −195  117  −39]$^T$ $*m$ where m and n are non-zero integer numbers.

14. The non-transitory computer readable storage medium of claim 13, wherein the method further comprises:

using the integer inverse transform function separately in horizontal and vertical direction of the first block of integer-transform coefficients to generate the corresponding second block of residual pixel values.

15. The non-transitory computer readable storage medium of claim 13, wherein the first block and the second block represent a same first squared area of 8×8 pixels in a picture.

16. The non-transitory computer readable storage medium of claim 15, wherein said first squared area covers one fourth of a macro block representing a second squared area of 16×16 pixels in said picture.

* * * * *

UNITED STATES PATENT AND TRADEMARK OFFICE
CERTIFICATE OF CORRECTION

| | |
|---|---|
| PATENT NO. | : 8,175,156 B2 |
| APPLICATION NO. | : 11/972942 |
| DATED | : May 8, 2012 |
| INVENTOR(S) | : Gisle Bjontegaard |

It is certified that error appears in the above-identified patent and that said Letters Patent is hereby corrected as shown below:

On the title page, Item 75, the inventor's name is incorrect. Item 75 should read:

-- (75) Inventor: Gisle Bjontegaard, Oppegard (NO) --

Signed and Sealed this
First Day of October, 2013

Teresa Stanek Rea
*Deputy Director of the United States Patent and Trademark Office*